United States Patent
Kim et al.

(10) Patent No.: US 11,314,006 B2
(45) Date of Patent: Apr. 26, 2022

(54) METHOD FOR MANUFACTURING POLARIZER AND POLARIZER MANUFACTURED BY THE SAME

(71) Applicant: LG CHEM, LTD., Seoul (KR)

(72) Inventors: Ji Young Kim, Daejeon (KR); Ji Young Kim, Daejeon (KR); Hye Min Yu, Daejeon (KR); Kyun Il Rah, Daejeon (KR); Jin Yong Park, Daejeon (KR); Eungki Lee, Daejeon (KR); Taek Geun Nam, Daejeon (KR)

(73) Assignee: LG CHEM, LTD., Seoul (KR)

( * ) Notice: Subject to any disclaimer, the term of this patent is extended or adjusted under 35 U.S.C. 154(b) by 617 days.

(21) Appl. No.: 16/137,293

(22) Filed: Sep. 20, 2018

(65) Prior Publication Data

US 2019/0072699 A1 Mar. 7, 2019

Related U.S. Application Data

(62) Division of application No. 15/006,819, filed on Jan. 26, 2016, now Pat. No. 10,114,159.

(30) Foreign Application Priority Data

Jan. 27, 2015 (KR) .................. 10-2015-0013037
Sep. 22, 2015 (KR) .................. 10-2015-0134112

(51) Int. Cl.
*B32B 27/32* (2006.01)
*G02B 5/30* (2006.01)
(Continued)

(52) U.S. Cl.
CPC .............. *G02B 5/3033* (2013.01); *B32B 7/12* (2013.01); *B32B 27/00* (2013.01); *B32B 27/08* (2013.01); *B32B 27/26* (2013.01); *B32B 27/306* (2013.01); *B32B 27/308* (2013.01); *B32B 27/32* (2013.01); *G02B 1/08* (2013.01); *G02B 1/14* (2015.01); *B32B 2255/10* (2013.01); *B32B 2255/26* (2013.01); *B32B 2307/4026* (2013.01); *B32B 2307/42* (2013.01); *B32B 2307/514* (2013.01);
(Continued)

(58) Field of Classification Search
CPC .................................... B32B 27/306
See application file for complete search history.

(56) References Cited

U.S. PATENT DOCUMENTS

2008/0192345 A1  8/2008  Mochizuki ............ B29C 55/026
                                                             359/485.01
2010/0202051 A1  8/2010  Yoshimi et al.
2011/0217542 A1  9/2011  Moroishi et al.

FOREIGN PATENT DOCUMENTS

CN          1971362 A     5/2007
CN          1979231 A     6/2007
(Continued)

OTHER PUBLICATIONS

Machine Translation of CN 102311552 (Year: 2012).*

*Primary Examiner* — Zachary M Davis
(74) *Attorney, Agent, or Firm* — Dentons US LLP (57) ABSTRACT

The present specification relates to a method for manufacturing a polarizer and a polarizer manufactured by using the same, and more particularly, to a method for manufacturing a polarizer, which includes a cross-linking and elongating step using an aqueous solution including a polyvalent carboxylic acid compound and a boric acid compound, and a polarizer manufactured by using the same.

2 Claims, 1 Drawing Sheet

(51) Int. Cl.
 *B32B 7/12* (2006.01)
 *B32B 27/08* (2006.01)
 *B32B 27/26* (2006.01)
 *B32B 27/30* (2006.01)
 *G02B 1/14* (2015.01)
 *G02B 1/08* (2006.01)
 *B32B 27/00* (2006.01)

(52) U.S. Cl.
 CPC ..... *B32B 2307/54* (2013.01); *B32B 2307/732* (2013.01); *B32B 2307/734* (2013.01); *B32B 2457/20* (2013.01); *B32B 2551/00* (2013.01)

(56) References Cited

FOREIGN PATENT DOCUMENTS

| | | | | |
|---|---|---|---|---|
| CN | 101137917 A | 3/2008 | | |
| CN | 101169493 A | 4/2008 | | |
| CN | 101281267 A | 10/2008 | | |
| CN | 101281268 A | 10/2008 | | |
| CN | 101784629 A | 7/2010 | | |
| CN | 101809472 A | 8/2010 | | |
| CN | 101852879 A | 10/2010 | | |
| CN | 102311552 A | * | 1/2012 | |
| JP | 2005-241689 A | 9/2005 | | |
| JP | 2008-039808 A | 2/2008 | | |
| JP | 2009-098653 A | 5/2009 | | |
| KR | 10-2011-0135321 A | 12/2011 | | |
| TW | 200718989 A | 5/2007 | | |
| TW | 201144362 A1 | 12/2011 | | |
| WO | WO 2012002662 A2 | 1/2012 | ............. | C09K 19/54 |

* cited by examiner

METHOD FOR MANUFACTURING POLARIZER AND POLARIZER MANUFACTURED BY THE SAME

This application is a Divisional of U.S. application Ser. No. 15/006,819, filed Jan. 26, 2016, and claims priority to Korean Application Nos. 10-2015-0013037, filed on Jan. 27, 2015 and 10-2015-0134112, filed on Sep. 22, 2015, all of which are hereby incorporated by reference in their entireties as if fully set forth herein.

CROSS-REFERENCE TO RELATED APPLICATIONS

This application claims priority to and the benefit of Korean Patent Application No. 10-2015-0013037 filed in the Korean Intellectual Property Office on Jan. 27, 2015, and Korean Patent Application No. 10-2015-0134112 filed in the Korean Intellectual Property Office on Sep. 22, 2015, the entire contents of which are incorporated herein by reference.

TECHNICAL FIELD

The present specification relates to a method for manufacturing a polarizer and a polarizer manufactured by using the same.

BACKGROUND ART

A liquid crystal display is a display visualizing polarization by a switching effect of a liquid crystal, and is used in various categories ranging from small and medium displays, such as a wrist watch, an electronic calculator, and a mobile phone, to a large-scale TV.

Recently, as a considerable number of polarizing plates mass-produced and commercialized for display devices, a matter, which is obtained by attaching an optically transparent protection film having mechanical strength onto both surfaces or one surface of a polarizing film (polarizer) formed by coloring a dichromatic material such as an iodine or dichromatic dye on a base film formed of a polyvinyl alcohol-based film, followed by cross-linking by a boron compound and elongating and aligning, has been used.

However, there is a problem in that in the elongated polyvinyl alcohol-based film polarizer, under a durability condition such as a high temperature and a high humidity, shrinkage and deformation easily occur. When the polarizer is deformed, there are problems in that stress thereof affects the protection film and causes bending, and as a result, a change in physical property of the polarizing plate including the polarizer and a light leakage phenomenon in a liquid crystal display occur.

The boron compound generally used in a cross-linking step of a process for manufacturing the polarizer has a short cross-linking chain which causes significant width shrinkage by an elongating process, and this becomes a main factor of shrinkage and deformation of the polarizer. In order to solve this, a method for using an organic cross-linking agent in addition to the boron compound, specifically, a method for performing cross-linking treatment by a polyvalent aldehyde compound has been proposed. However, aldehyde has a peculiar odor and a problem in terms of handling stability. Further, a method for performing cross-linking treatment by a polyvalent carboxylic acid compound has been proposed, but does not have a sufficient improvement effect of shrinkage and deformation of the polarizer.

PRIOR ART DOCUMENT

Patent Document

Japanese Patent Application Laid-Open No. 2007-199248 A

SUMMARY OF THE INVENTION

The present specification has been made in an effort to provide a method for manufacturing a polarizer and a polarizer manufactured by using the same.

An exemplary embodiment of the present specification provides a method for manufacturing a polarizer, the method including: a step of dyeing at least one dye of iodine and dichromatic dyes on a polyvinyl alcohol-based film; a first cross-linking and elongating step of cross-linking and elongating the polyvinyl alcohol-based film and the dye by using a first aqueous solution including a polyvalent carboxylic acid compound and a boron compound; a second cross-linking and elongating step of cross-linking and elongating the polyvinyl alcohol-based film and the dye by using a second aqueous solution including the polyvalent carboxylic acid compound and the boron compound; and a step of drying the polyvinyl alcohol-based film, in which the first cross-linking and elongating step and the second cross-linking and elongating step satisfy the following Equations (1) and (2).

$$X+Y \geq 0.1 \quad \text{Equation (1):}$$

$$XY \geq 0.002 \quad \text{Equation (2):}$$

In Equations (1) and (2), X is [a content of the polyvalent carboxylic acid compound of the first aqueous solution]/[a content of the boron compound of the first aqueous solution] of the first cross-linking and elongating step, and Y is [a content of the polyvalent carboxylic acid compound of the second aqueous solution]/[a content of the boron compound of the second aqueous solution] of the second elongating and cross-linking step.

The exemplary embodiment of the present specification provides a polarizer manufactured by the aforementioned manufacturing method.

Another exemplary embodiment of the present specification provides a polarizer including: 0.5 wt % to 5 wt % of a boron element based on 100 wt % of the polarizer.

Another exemplary embodiment of the present specification provides a polarizing plate including: the polarizer.

Another exemplary embodiment of the present specification provides a polarizing plate where after evaluating durability under a condition where the polarizing plate is left at any one temperature selected from 60° C. to 70° C. for 48 hours and then left at any one temperature selected from 20° C. to 30° C. for 24 hours, a machine direction (MD) shrinkage ratio is 0.01% to 0.05%.

Another exemplary embodiment of the present specification provides a polarizing plate where after evaluating durability under a condition where the polarizing plate is left at any one temperature selected from 60° C. to 70° C. for 48 hours and then left at any one temperature selected from 20° C. to 30° C. for 24 hours, a relative dimensional variation ratio ($Z/Z_0$) satisfies the following Equation (3), the polarizing plate including: a polarizer and a protection film attached to at least one surface of the polarizer by using an adhesive layer.

$$0 < |Z/Z_0| < 0.85 \quad \text{Equation (3):}$$

In Equation (3), Z is a dimensional variation ratio of the polarizing plate including the polarizer manufactured by performing first and second cross-linking and elongating steps by an aqueous solution including a polyvalent carboxylic acid compound and a boron compound, $Z_0$ is a dimensional variation ratio of the polarizing plate including the polarizer obtained by performing both the first and second cross-linking and elongating steps by using the aqueous solution including the boron compound but not including the polyvalent carboxylic acid compound, and in Z and $Z_0$, contents of the boron compounds in the aqueous solutions are the same as each other.

Another exemplary embodiment of the present specification provides a polarizing plate where after evaluating durability under a condition where the polarizing plate is left at any one temperature selected from 60° C. to 70° C. for 48 hours and then left at any one temperature selected from 20° C. to 30° C. for 24 hours, a relative dimensional variation ratio ($Z/Z_0$) satisfies the following Equation (3), the polarizing plate including: a polarizer and a protection film attached to at least one surface of the polarizer by using an adhesive layer, in which the protection film is an acryl-based film, the adhesive layer includes a cured material of an adhesive composition including an epoxy monomer or an acrylate-based monomer and a photopolymerization initiator and has a thickness of 2 μm to 4 μm.

$$0 < |Z/Z_0| < 0.85 \quad \text{Equation (3):}$$

In Equation (3), Z is a dimensional variation ratio of the polarizing plate including the polarizer manufactured by performing first and second cross-linking and elongating steps by an aqueous solution including a polyvalent carboxylic acid compound and a boron compound, $Z_0$ is a dimensional variation ratio of the polarizing plate including the polarizer obtained by performing both the first and second cross-linking and elongating steps by using the aqueous solution including the boron compound but not including the polyvalent carboxylic acid compound, and in Z and $Z_0$, contents of the boron compounds in the aqueous solutions are the same as each other.

Another exemplary embodiment of the present specification provides an image display device including: a display panel; and the polarizing plate attached to one surface or both surfaces of the display panel.

In a method for manufacturing a polarizer according to an exemplary embodiment of the present specification, it is possible to manufacture the polarizer having excellent optical property and durability.

Further, in the method for manufacturing the polarizer according to the exemplary embodiment of the present specification, it is possible to manufacture the polarizer having excellent dimensional stability. As a result, there is a merit in that a polarizing plate including the polarizer has also excellent dimensional stability.

Further, the polarizer according to the exemplary embodiment of the present specification has a more excellent shrinkage and deformation improvement effect under a durability condition such as a high temperature and a high humidity with a small thickness thereof, and thus it is possible to effectively reduce a thickness of the polarizer.

The polarizer according to the exemplary embodiment of the present specification has an excellent handling property.

DETAILED DESCRIPTION

Hereinafter, the present specification will be described in more detail.

A method for manufacturing a polarizer according to an exemplary embodiment of the present specification includes first and second cross-linking steps, and both steps use an aqueous solution including a polyvalent carboxylic acid compound and a boron compound. By including the polyvalent carboxylic acid compound that is an organic cross-linking agent in addition to the boron compound that is an inorganic cross-linking agent, an effect of preventing width shrinkage of a film by cross-linking and also reducing a shrinkage ratio under a heat resistance condition may be obtained. However, in the case where the polyvalent carboxylic acid compound in addition to the boron compound is added in only the first cross-linking step but only the boron compound is added in the second cross-linking step, in a state where a cross-linking reaction of the polyvalent carboxylic acid compound is not sufficiently performed, the polyvalent carboxylic acid compound is washed out in the second cross-linking step to significantly reduce an addition effect of the polyvalent carboxylic acid compound. Further, in the case where only the boron compound is added in the first cross-linking step but the polyvalent carboxylic acid compound in addition to the boron compound is added in only the second cross-linking step, after a portion of the cross-linking reaction by the boron compound first occurs, immersion in the aqueous solution including the polyvalent carboxylic acid compound is performed, and thus an addition effect of the polyvalent carboxylic acid compound into the film is reduced. Meanwhile, in the case where the boron compound and the polyvalent carboxylic acid compound are included in both the first cross-linking step and the second cross-linking step, there is a merit in that two compounds may be uniformly distributed in the film to perform cross-linking. As a result, in the case where the first and second cross-linking steps are performed by using the aqueous solution including both the boric acid compound and the polyvalent carboxylic acid compound, while excellent optical properties are maintained, width shrinkage of the polarizer by cross-linking may be relieved, and shrinkage and deformation improvement under the heat resistance condition may be effectively reinforced. Meanwhile, in order to describe an effect with respect to the cross-linking step, the first and second cross-linking steps are described in the above, but in the manufacturing method according to the present specification, cross-linking and elongating are simultaneously performed. That is, the method for manufacturing the polarizer according to the present specification includes a first cross-linking and elongating step and a second cross-linking and elongating step.

In the method for manufacturing the polarizer according to the exemplary embodiment of the present specification, the first and second cross-linking and elongating steps may be performed by the aqueous solution including both the polyvalent carboxylic acid compound and the boron compound to manufacture the polarizer having excellent dimensional stability. Specifically, the polarizer having a more excellent shrinkage and deformation improvement effect may be manufactured in a small thickness.

Meanwhile, the polyvalent carboxylic acid compound may mean a carboxylic acid compound including two or more carboxyl groups (—COOH). In order to perform cross-linking with polyvinyl alcohol, two or more substituent groups capable of being reacted with a hydroxy group (—OH) of polyvinyl alcohol need to exist in one molecule of the cross-linking agent. Therefore, in the method for manufacturing the polarizer according to the present specification, the polyvalent carboxylic acid compound having two or more carboxyl groups is used.

The method is not limited thereto, and therefore, for example, polyvinyl alcohol and polyvalent carboxylic acid may be reacted to introduce a cross-linking form having the following structure into the polarizer.

In the present specification, the first aqueous solution and the second aqueous solution are the same as or different from each other.

According to the exemplary embodiment of the present specification, the first and second cross-linking and elongating steps satisfy the following Equations (1) and (2).

$$X+Y \geq 0.1 \quad \text{Equation (1):}$$

$$XY \geq 0.002 \quad \text{Equation (2):}$$

In Equations (1) and (2), X is [a content of the polyvalent carboxylic acid compound of the first aqueous solution]/[a content of the boron compound of the first aqueous solution] of the first cross-linking and elongating step, and Y is [a content of the polyvalent carboxylic acid compound of the second aqueous solution]/[a content of the boron compound of the second aqueous solution] of the second cross-linking and elongating step.

In the case where the first and second cross-linking and elongating steps satisfy Equation (1) and Equation (2), there are merits in that the aforementioned effect is maximized, and as a result, the polarizer having excellent dimensional stability is capable of being manufactured, and a polarizing plate including the polarizer also has excellent dimensional stability and durability.

According to the exemplary embodiment of the present specification, the first and second aqueous solutions may each include the boron compound in a content of 0.5 wt % to 10 wt %, specifically 1 wt % to 6 wt %, and more specifically 1 wt % to 4 wt %, based on 100 wt % of the first and second aqueous solutions. In the case where the boron compound is included in a content of less than 1 wt % based on 100 wt % of the aqueous solution, since the cross-linking reaction of the boron compound is not sufficiently performed, there are problems of the occurrence of wrinkles and a reduction in optical property of the polarizer, and in the case where the boron compound is included in a content of more than 10 wt %, there is a problem in that due to the excessive cross-linking reaction with the boron compound, it is difficult to perform the elongating step.

According to the exemplary embodiment of the present specification, the first and second aqueous solutions may each include the polyvalent carboxylic acid compound in a content of 10 wt % to 150 wt %, specifically 20 wt % to 100 wt %, and more specifically 20 wt % to 80 wt %, based on 100 wt % of the boron compound. In the case where the polyvalent carboxylic acid compound is included in a content of less than 10 wt % based on 100 wt % of the boron compound, since addition of the polyvalent carboxylic acid and the cross-linking reaction are not sufficiently performed, an effective shrinkage and deformation improvement effect may not be obtained. Specifically, in order to embody a more excellent shrinkage and deformation improvement effect in a small thickness, it is preferable to satisfy the aforementioned range. Meanwhile, in the case where the polyvalent carboxylic acid compound is included in a content of more than 150 wt % based on 100 wt % of the boron compound, since the cross-linking reaction of the boron compound is not effectively performed, there are problems of the occurrence of wrinkles and a reduction in optical property of the polarizer.

Meanwhile, ratios of the boron compound and the polyvalent carboxylic acid compound included in the first and second aqueous solutions may be the same as each other, or if necessary, may be different from each other.

According to another exemplary embodiment, the polyvalent carboxylic acid compound may be one or more kinds selected from the group consisting of glutaric acid, succinic acid, malonic acid, oxalic acid, 1,2,3,4-butane tetracarboxylic acid, citric acid, malic acid, tartaric acid, and a derivative thereof. However, the polyvalent carboxylic acid compound is not limited thereto.

Figure 1:
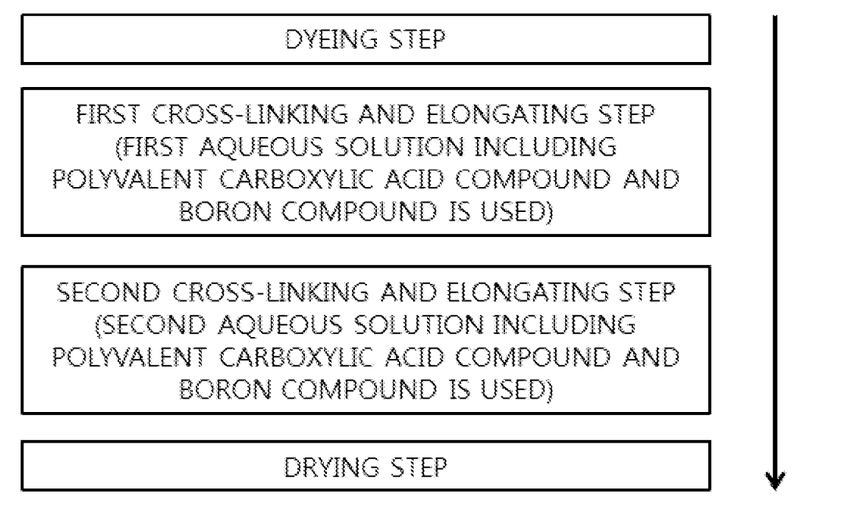
FIG. 1 is a flowchart of a method for manufacturing a polarizer according to the exemplary embodiment of the present specification.

Hereinafter, each step of a method for manufacturing the polarizer of the present specification will be more specifically described with reference to FIG. 1.

First, the step of performing dyeing (hereinafter, 'dyeing step') is to dye the iodine molecules and/or dichromatic dyes on the polyvinyl alcohol-based film, and the iodine molecules and/or dichromatic dye molecules may absorb light that vibrates in an elongation direction of the polarizer and allow light that vibrates in a vertical direction to pass, thus obtaining polarization having a predetermined vibration direction. In this case, the dyeing may be, for example, performed by impregnating the polyvinyl alcohol-based film in a treatment bath including an iodine solution and/or a solution containing the dichromatic dye.

In this case, as a solvent used in the solution of the dyeing step, water is generally used, but an organic solvent having compatibility with water may be added in an appropriate amount. Meanwhile, the iodine and/or dichromatic dyes may be used in a content of 0.06 parts by weight to 0.25 parts by weight based on 100 parts by weight of the solvent. In the case where the content of the dichromatic material such as iodine is in the aforementioned range, transmittance of the polarizer manufactured after elongation may satisfy the range of 40% to 47%.

Meanwhile, in the case where iodine is used as the dichromatic material, in order to improve dyeing efficiency, it is preferable that a supplement agent such as an iodide compound is further contained, and the supplement agent may be used at a ratio of 0.3 parts by weight to 2.5 parts by weight based on 100 parts by weight of the solvent. In this case, the supplement agent such as the iodide compound is added in order to increase solubility of iodine to water because solubility of iodine to water is low. Meanwhile, it is preferable that a mixing ratio of iodine and the iodide compound is about 1:5 to 1:10 on the basis of a weight.

Specific examples of the iodide compound that may be added may include potassium iodide, lithium iodide, zinc iodide, aluminum iodide, lead iodide, copper iodide, barium iodide, calcium iodide, tin iodide, titanium iodide, a mixture thereof, or the like, but are not limited thereto.

Meanwhile, it is preferable that a temperature of the treatment bath is maintained at about 25° C. to 40° C. In the case where the temperature of the treatment bath is less than 25° C., dyeing efficiency may be reduced, and in the case where the temperature is more than 40° C., sublimation of iodine may occur many times to increase a use amount of iodine.

In this case, it is preferable that an immersion time of the polyvinyl alcohol-based film in the treatment bath is about 30 seconds to 120 seconds. This is because in the case where the immersion time is less than 30 seconds, dyeing may not be uniformly performed on the polyvinyl alcohol-based film, and in the case where the immersion time is more than 120 seconds, dyeing is saturated, and thus immersion is not needed any longer.

Next, the first and second cross-linking and elongating steps are performed.

Meanwhile, the cross-linking and elongating steps are to adsorb the iodine and/or dichromatic dyes on a polyvinyl alcohol polymer matrix and align polymer chains in a predetermined direction and thus obtain desired polarization properties, and a deposition method of performing the cross-linking and elongating steps by depositing the polyvinyl alcohol-based film in an aqueous solution is generally used, but the method is not limited thereto, and the cross-linking and elongating steps may be performed by an application method or spray method of applying or spraying a solution including a cross-linking agent on the polyvinyl alcohol-based film.

In this case, as the solvent used in the first and second aqueous solutions, water is generally used, but an organic solvent having compatibility with water may be added in an appropriate amount.

Meanwhile, the temperature of the first and second aqueous solutions depends on the amount and the stretching ratio of the cross-linking agent and is not limited thereto, but, generally, it is preferable that the temperature is 30° C. to 60° C. Specifically, the temperature may be 33° C. to 60° C. or 35° C. to 60° C. Generally, if the amount of the cross-linking agent is increased, in order to improve mobility of chains of the polyvinyl alcohol-based film, the temperature of the cross-linking bath is adjusted to a high temperature condition, and if the amount of the cross-linking agent is small, the temperature of the cross-linking bath is adjusted to a relatively low temperature condition. Meanwhile, it is preferable that the immersion time of the polyvinyl alcohol-based film in the aqueous solution is about 30 seconds to 120 seconds. This is because in the case where the immersion time is less than 30 seconds, cross-linking may not be uniformly performed on the polyvinyl alcohol-based film, and in the case where the immersion time is more than 120 seconds, cross-linking is saturated, and thus immersion is not needed any longer.

The solvents used in the first and second aqueous solutions and the temperatures thereof may be the same as each other, or according to the necessity such as securing processability, may be different from each other.

The aforementioned content is applied to the description with respect to the polyvalent carboxylic acid compound and the boron compound that are the cross-linking agents included in the first and second aqueous solutions as it is.

Meanwhile, the first and second aqueous solutions may further include an iodine-based compound in addition to the polyvalent carboxylic acid compound and the boron compound. In this case, the iodine-based compound included in the aqueous solution serves to adjust a polarizing property and a color. The iodine-based compound may be adopted without a limit as long as the iodine-based compound is an iodine-based compound which may be used as a supplement agent in the dyeing step and is known in this technical field, and for example, may correspond to potassium iodide, calcium iodide, lithium iodide, and the like. Meanwhile, the iodine-based compound is not limited thereto, and may be preferably included in a content of 1 wt % to 10 wt % based on 100 wt % of each of the first and second aqueous solutions.

In this case, it is preferable that in the cross-linking and elongating steps, the polyvinyl alcohol-based film is elongated at an elongation ratio of 4.5 times to 8 times. The reason is that the polymer chains of the polyvinyl alcohol-based film need to be aligned in order to provide polarization performance to the polyvinyl alcohol-based film, and the chains may not be sufficiently aligned at the elongation ratio of less than 4.5 times, and the chains of the polyvinyl alcohol-based film may be cut at the elongation ratio of more than 8 times.

In this case, it is preferable that the elongation is performed at an elongation temperature of 30° C. to 60° C. This is because the elongation temperature may depend on the content of the cross-linking agent, mobility of the chains of the polyvinyl alcohol-based film may be reduced at the temperature of less than 30° C. to reduce elongation efficiency, and in the case where the temperature is more than 60° C., the polyvinyl alcohol-based film may be softened to weaken strength.

Meanwhile, the elongation may be performed on only the polyvinyl alcohol-based film, or may be performed by a method of laminating a base film on the polyvinyl alcohol-based film and then elongating the polyvinyl alcohol-based film and the base film together. The base film is used to prevent the polyvinyl alcohol-based film from being broken in the elongation process in the case where the polyvinyl alcohol-based film having a small thickness (for example, PVA film of 60 μm or less) is elongated, and may be used to manufacture a thin PVA polarizer of 10 μm or less.

In this case, as the base film, polymer films having a maximum elongation magnification of 5 times or more under a temperature condition of 20° C. to 85° C. may be used, and for example, a high density polyethylene film, a polyurethane film, a polypropylene film, a polyolefin film, an ester-based film, a low density polyethylene film, high density polyethylene and low density polyethylene co-extrusion films, a copolymer resin film in which ethylene vinyl acetate is contained in high density polyethylene, an acryl film, a polyethylene terephthalate film, a polyvinyl alcohol-based film, a cellulose-based film, and the like may be used. Meanwhile, the maximum elongation magnification means an elongation magnification immediately before breakage occurs.

Further, a lamination method of the base film and the polyvinyl alcohol-based film is not particularly limited. For example, the base film and the polyvinyl alcohol-based film may be laminated via an adhesive or a cohesive agent, or may be laminated by a method where the polyvinyl alcohol-based film is set on the base film without a separate medium. Further, lamination may be performed by a method of co-extruding a resin forming the base film and a resin forming the polyvinyl alcohol-based film, or may be performed by a method of applying a polyvinyl alcohol-based resin on the base film.

Meanwhile, the base film may be detached from the polarizer and removed after elongation is completed, but may not be removed but be subjected to a next step. In this case, the base film may be used as a polarizer protection film which will be described below and the like.

Next, the step of drying the polyvinyl alcohol-based film is performed.

The drying step is to remove water or the solvent remaining in the polarizer and correct deformation of an appearance of the polarizer, and may be performed through a method for drying the polarizer, which is known in this technical field. For example, the drying step may be performed by a method of passing the polarizer through a heating roll, or a method of drying the polarizer in an oven.

The method for manufacturing the polarizer according to the exemplary embodiment of the present specification may include, if necessary, an additional step known in this technical field. For example, a washing step may be performed after the cross-linking and elongating step, but the additional step is not limited thereto. In other words, after the cross-linking and elongating step, a separate washing step may not be performed, and in this case, there is a merit in that a problem such as a reduced effect by polyvalent carboxylic acid after the washing step may be avoided.

Further, the exemplary embodiment of the present specification provides a polarizer manufactured according to the aforementioned exemplary embodiments. The polarizer manufactured by the manufacturing method according to the exemplary embodiment of the present specification has the aforementioned effect. That is, dimensional stability, durability, and the like are excellent.

Meanwhile, as the thickness of the polarizer is reduced, the aforementioned effect is maximized. That is, in the first and second cross-linking and elongating steps, the effect obtained by using the aqueous solution including both the boron compound and the polyvalent carboxylic acid compound is further increased as the thickness of the polarizer is reduced. According to the exemplary embodiment of the present specification, the thickness of the polarizer manufactured according to the aforementioned manufacturing method may be 5 μm to 25 μm.

Further, the exemplary embodiment of the present specification provides a polarizing plate including the polarizer. That is, there is provided the polarizing plate including the polarizer manufactured by the manufacturing method according to the exemplary embodiment of the present specification.

Further, the exemplary embodiment of the present specification provides a polarizer including 0.5 wt % to 5 wt % of a boron element based on 100 wt % of the polarizer. The content of the boron element based on the polarizer may be a numerical value representing the content of the boric acid compound in the polarizer. As the content of the boric acid compound remaining in the polarizer is reduced, excellent dimensional stability may be exhibited.

According to the exemplary embodiment of the present specification, the thickness of the polarizer having the aforementioned boron content may be 5 μm to 25 μm.

Further, the exemplary embodiment of the present specification provides a polarizing plate including the polarizer, and the polarizer is a polarizer including 0.5 wt % to 5 wt % of a boron element based on 100 wt % of the polarizer.

In the present specification, the polarizing plate may adopt the constitution known in this technical field without a limit, except that the polarizing plate includes the polarizer according to the exemplary embodiment of the present specification, and constitutional elements and a lamination order are not particularly limited. For example, a protection film, a hard coating layer, a retardation film, and the like may be provided on at least one surface of the polarizer, and a protection film and the like may be provided on both surfaces of the polarizer.

Further, the exemplary embodiment of the present specification provides a polarizing plate where after evaluating durability under a condition where the polarizing plate is left at any one temperature selected from 60° C. to 70° C. for 48 hours and then left at any one temperature selected from 20° C. to 30° C. for 24 hours, a machine direction (MD) shrinkage ratio is 0.01% to 0.05%. In this case, among the evaluation conditions of durability, any one temperature selected from 60° C. to 70° C. means any one selected predetermined temperature from 60° C. to 70° C. but need not satisfy the shrinkage ratio value of the polarizing plate throughout the entire temperature range of 60° C. to 70° C. Among the evaluation conditions of durability, any one temperature selected from 20° C. to 30° C. means any one predetermined temperature selected likewise but need not satisfy the shrinkage ratio value of the polarizing plate throughout the entire temperature range of 20° C. to 30° C. For example, according to the exemplary embodiment of the present specification, the polarizing plate may be a polarizing plate where after evaluating durability under the condition where the polarizing plate is left at the temperature of 65° C. for 48 hours and then left at the temperature of 25° C. for 24 hours, the machine direction (MD) shrinkage ratio is 0.01% to 0.05%.

According to the exemplary embodiment of the present specification, the thickness of the polarizer included in the polarizing plate where after evaluating durability, the machine direction (MD) shrinkage ratio is 0.01% to 0.05% may be 5 μm to 25 μm.

Further, the exemplary embodiment of the present specification provides a polarizing plate where, after evaluating durability under the same condition as the aforementioned durability evaluation condition with respect to the machine direction (MD) shrinkage ratio of the polarizing plate after evaluating durability, the relative dimensional variation ratio ($Z/Z_0$) satisfies the following Equation (3). In this case, the polarizing plate includes a protection film attached to the polarizer and at least one surface of the polarizer by using an adhesive layer.

$$0 < |Z/Z_0| < 0.85 \qquad \text{Equation (3):}$$

In Equation (3), Z is a dimensional variation ratio of the polarizing plate (polarizing plate according to the exemplary embodiment of the present specification) including the polarizer manufactured by performing first and second cross-linking and elongating steps by an aqueous solution including a polyvalent carboxylic acid compound and a boron compound, $Z_0$ is a dimensional variation ratio of the polarizing plate including the polarizer obtained by performing both the first and second cross-linking and elongating steps by using the aqueous solution including the boron compound but not including the polyvalent carboxylic acid compound, and in Z and $Z_0$, contents of the boron compounds in the aqueous solutions are the same as each other.

The dimensional variation ratio(%) means a value obtained by(length of polarizing plate after evaluating durability−length of initial polarizing plate)/(length of initial polarizing plate)×100.

After durability evaluation, the relative dimensional variation ratio $(Z/Z_0)$ of $0<|Z/Z_0|<1.0$ means improvement of dimensional stability due to addition of the polyvalent carboxylic acid compound, and as the relative dimensional variation ratio becomes close to 0, it means that under the durability condition, as compared to the case where the polyvalent carboxylic acid compound is not included, dimensional variation is improved, and thus small dimensional variation occurs. Further, if the relative dimensional variation ratio is more than 1, the relative dimensional variation ratio means that as compared to the case where the polyvalent carboxylic acid compound is not included, dimensional variation is large, and thus dimensional stability rather deteriorates.

Meanwhile, it is preferable that durability is evaluated in a state where the same temperature is maintained in order to perform precise evaluation. Specifically, it is preferable to perform evaluation in a state where any one temperature selected within the aforementioned temperature range is maintained.

Further, the exemplary embodiment of the present specification provides a polarizing plate where the relative dimensional variation ratio $(Z/Z_0)$ after evaluating durability under the same condition as the aforementioned durability evaluation condition with respect to the machine direction (MD) shrinkage ratio after evaluating durability of the polarizing plate satisfies Equation (3). In this case, the polarizing plate includes the protection film attached to the polarizer and at least one surface of the polarizer by using the adhesive layer, the protection film is an acryl-based film, and the adhesive layer includes a cured material of an adhesive composition including an epoxy monomer or an acrylate-based monomer and a photopolymerization initiator and has a thickness of 2 μm to 4 μm.

In this case, the acryl-based film is not particularly limited as long as the acryl-based film is a matter formed by using a (meth)acrylate-based copolymer resin as a main component. For example, the acryl-based film may be a matter formed by using a resin composition including (a) a (meth)acrylate-based monomer including one kind or more (meth)acrylate-based derivatives; (b) an aromatic-based monomer having a chain having a hydroxy group-containing portion and an aromatic portion; and (c) a styrene-based monomer including one kind or more styrene-based derivatives.

Meanwhile, the photopolymerization initiator, the epoxy monomer, and the acrylate-based monomer included in the adhesive composition are not particularly limited as long as they are matters known in this technical field.

Further, the exemplary embodiment of the present specification provides an image display device including a display panel; and the polarizing plate according to the aforementioned exemplary embodiment attached to one surface or both surfaces of the display panel.

The display panel may be a liquid crystal panel, a plasma panel, and an organic light emitting panel, and thus the image display device may be a liquid crystal display (LCD), a plasma display panel (PDP), and an organic light emitting diode (OLED).

To be more specific, the image display device may be a liquid crystal display including a liquid crystal panel and polarizing plates provided on both surface of the liquid crystal panel, and in this case, at least one of the polarizing plates may be the polarizing plate manufactured by the aforementioned method for manufacturing the polarizing plate according to the exemplary embodiment of the present specification.

In this case, a kind of liquid crystal panel included in the liquid crystal display is not particularly limited. For example, all publicly known panels such as a passive matrix-type panel, such as a twisted nematic (TN) type, a super twisted nematic (STN) type, a ferroelectic (F) type, or a polymer dispersed (PD) type; an active matrix-type panel such as a two terminal type or a three terminal type; and an in plane switching (IPS) panel, and a vertical alignment (VA) panel, may be applied, but the kind of liquid crystal panel is not limited thereto. Further, a kind of other constitutions constituting the liquid crystal display, for example, upper and lower substrates (for example, a color filter substrate or an array substrate) and the like, is not particularly limited, and a constitution publicly known in this field may be adopted without a limit.

Hereinafter, the present specification will be described in more detail through the Examples. However, the following Examples are set forth to illustrate the present specification, but the scope of the present specification is not limited thereto.

Example 1

The polyvinyl alcohol film having the thickness of 30 μm was immersed in the aqueous solution containing 0.1 wt % of iodine and 1 wt % of potassium iodide (KI) at 30° C. for 40 seconds to be dyed. In this case, in the dyeing solution, the polyvinyl alcohol film was elongated three times. Next, while the polyvinyl alcohol film was immersed in the first aqueous solution containing 1.5 wt % of the glutaric acid and 1 wt % of the boric acid (X=1.5) at 35° C. for 20 seconds, the cumulative elongating ratio was configured so as to be 3.5 times. While the polyvinyl alcohol film was immersed in the second aqueous solution containing 1 wt % of the glutaric acid and 2.5 wt % of the boric acid (Y=0.4) at 54° C. for 2 minutes, the cumulative elongating ratio was configured so as to be 5.4 times. After cross-linking and elongating, the film was dried in the oven at 80° C. for 2 minutes to manufacture the polarizer having the thickness of about 12 μm. The acryl film having the thickness of 40 μm was laminated on one surface of the manufactured polarizer by using the adhesive, and the cohesive agent was applied on the other surface to manufacture the polarizing plate.

Example 2

The polarizing plate was manufactured by the same procedure as Example 1, except that in the second aqueous solution, the content of the glutaric acid was 1.5 wt % and the content of the boric acid was 2.5 wt % (Y=0.6).

Example 3

The polarizing plate was manufactured by the same procedure as Example 1, except that in the second aqueous solution, the content of the glutaric acid was 2 wt % and the content of the boric acid was 2.5 wt % (Y=0.8).

Example 4

The polarizing plate was manufactured by the same procedure as Example 1, except that in the first aqueous solution, the content of the glutaric acid was 0.1 wt % and the content of the boric acid was 1 wt % (X=0.1), and in the second aqueous solution, the content of the glutaric acid was 0.1 wt % and the content of the boric acid was 2.5 wt % (Y=0.04).

Example 5

The polarizing plate was manufactured by the same procedure as Example 1, except that in the first aqueous solution, the content of the glutaric acid was 0.2 wt % and the content of the boric acid was 1 wt % (X=0.2), and in the second aqueous solution, the content of the glutaric acid was 0.5 wt % and the content of the boric acid was 2.5 wt % (Y=0.2).

Example 6

The polarizing plate was manufactured by the same procedure as Example 1, except that in the first aqueous solution, the content of the glutaric acid was 1 wt % and the content of the boric acid was 1 wt % (X=1).

Example 7

The polarizing plate was manufactured by the same procedure as Example 1, except that in the second aqueous solution, the content of the glutaric acid was 1 wt % and the content of the boric acid was 3 wt % (Y=0.33).

Example 8

The polarizing plate was manufactured by the same procedure as Example 1, except that in the second aqueous solution, the content of the glutaric acid was 1.5 wt % and the content of the boric acid was 3 wt % (Y=0.5).

Example 9

The polarizing plate was manufactured by the same procedure as Example 1, except that the polyvinyl alcohol film having the thickness of 40 μm was used and immersed in the first aqueous solution at 45° C., and the cumulative elongating ratio was configured so as to be six times in the second aqueous solution containing 1.5 wt % of the glutaric acid and 3 wt % of the boric acid (Y=0.5) at 58° C. to manufacture the polarizer having the thickness of about 16 μm.

Example 10

The polarizing plate was manufactured by the same procedure as Example 1, except that the polyvinyl alcohol film having the thickness of 60 μm was used and immersed in the first aqueous solution containing 1.5 wt % of the glutaric acid and 1.8 wt % of the boric acid (X=0.83) at 45° C., and the cumulative elongating ratio was configured so as to be six times in the second aqueous solution containing 1.5 wt % of the glutaric acid and 3.5 wt % of the boric acid (Y=0.43) at 55° C. to manufacture the polarizer having the thickness of about 23 μm.

Comparative Example 1

The polarizing plate was manufactured by the same procedure as Example 1, except that the contents of the glutaric acids of the first and second aqueous solutions were both 0.

Comparative Example 2

The polarizing plate was manufactured by the same procedure as Example 2, except that the contents of the glutaric acids of the first and second aqueous solutions were both 0.

Comparative Example 3

The polarizing plate was manufactured by the same procedure as Example 3, except that the contents of the glutaric acids of the first and second aqueous solutions were both 0.

Comparative Example 4

The polarizing plate was manufactured by the same procedure as Example 4, except that the contents of the glutaric acids of the first and second aqueous solutions were both 0.

Comparative Example 5

The polarizing plate was manufactured by the same procedure as Example 5, except that the contents of the glutaric acids of the first and second aqueous solutions were both 0.

Comparative Example 6

The polarizing plate was manufactured by the same procedure as Example 6, except that the contents of the glutaric acids of the first and second aqueous solutions were both 0.

Comparative Example 7

The polarizing plate was manufactured by the same procedure as Example 7, except that the contents of the glutaric acids of the first and second aqueous solutions were both 0.

Comparative Example 8

The polarizing plate was manufactured by the same procedure as Example 8, except that the contents of the glutaric acids of the first and second aqueous solutions were both 0.

Comparative Example 9

The polarizing plate was manufactured by the same procedure as Example 9, except that the contents of the glutaric acids of the first and second aqueous solutions were both 0.

Comparative Example 10

The polarizing plate was manufactured by the same procedure as Example 10, except that the contents of the glutaric acids of the first and second aqueous solutions were both 0.

<Experimental Example 1> Durability Evaluation of Polarizing Plates Manufactured According to Examples 1 to 10

The polarizing plates manufactured according to Examples 1 to 10 were cut in the size of 10 mm×160 mm. In this case, the elongating direction (MD direction) of the polarizing plate was configured to the long axis, and the direction orthogonal thereto was configured to the short axis. The polarizing plate was laminated on the glass via the applied cohesive agent to manufacture the sample.

The end of the sensor connected to the DMS (displacement measuring system) equipment was constituted by the laser emitting portion and the sensing portion. In the sample, the long axis of the polarizing plate was positioned to form the straight line together with the laser emitted from the sensor, and the reflector was attached to one end adjacent to the sensor. The DMS equipment is equipment continuously recording information on the distance between the sensor and the reflector by using the principle where the laser emitted from the sensor bumps against the reflector of the end of the sample and is then reflected to be returned and sensed. Therefore, the polarizing plate is shrunken as the distance between the sensor and the reflector is increased, and contrary to this, if the distance between the sensor and the reflector is reduced, the polarizing plate is expanded.

The dimensional variation ratio may be calculated by the following Equation from an initial value where the polarizing plate is stabilized at the temperature of 25° C. and relative humidity of 50% and a final value after the polarizing plate is shrunken in the oven at 65° C. for 48 hours and then restored at the temperature of 25° C. and relative humidity of 50% for 24 hours.

Dimensional variation ratio(%)=(length of polarizing plate after evaluating durability−length of initial polarizing plate)/(length of initial polarizing plate)×100

Since the polarizing plate tends to be mostly shrunken when durability is evaluated, the length after evaluating durability becomes shorter than the initial length, and thus the dimensional variation ratio has a negative value. As the dimensional variation ratio becomes close to 0, it means that a change in length is not large after evaluating durability. That is, as the dimensional variation ratio becomes close to 0, it means that dimensional stability is high.

<Experimental Example 2> Durability Evaluation of Polarizing Plates Manufactured According to Comparative Examples 1 to 10

The same experiment as Experimental Example 1 was performed, except that the polarizing plates manufactured according to Comparative Examples 1 to 10 were used.

After durabilities measured according to Experimental Examples 1 and 2 were evaluated, from the dimensional variation ratios ($Z$ and $Z_o$), the relative dimensional variation ratio ($Z/Z_o$) was calculated and is arranged in the following Table 1.

In the following Table 1, $Z$ and $Z_o$ are the same as those defined in Equation (3). That is, $Z$ means the dimensional variation ratios of the polarizing plates manufactured according to Examples 1 to 10, and $Z_o$ means the dimensional variation ratios of the polarizing plates manufactured according to Comparative Examples 1 to 10.

In the following Table, a1 means the content (wt %) of the polyvalent carboxylic acid compound of the first aqueous solution used in the first cross-linking and elongating step, b1 means the content (wt %) of the boron compound, and X means a ratio (a1/b1) of the content of the polyvalent carboxylic acid compound and the content of the boron compound on the first aqueous solution.

Further, a2 means the content (wt %) of the polyvalent carboxylic acid compound of the second aqueous solution used in the second cross-linking and elongating step, b2 means the content (wt %) of the boron compound, and Y means a ratio (a2/b2) of the content of the polyvalent carboxylic acid compound and the content of the boron compound on the second aqueous solution.

TABLE 1

| Classification | Thickness of polyvinyl alcohol film (µm) | First cross-linking and elongating step | | | Second cross-linking and elongating step | | | After durability evaluation, MD direction dimensional variation ratio | | Relative dimensional variation ratio |
| --- | --- | --- | --- | --- | --- | --- | --- | --- | --- | --- |
| | | a1 (wt %) | b1 (wt %) | X (a1/b2) | a2 (wt %) | b2 (wt %) | Y (a2/b2) | (—) Z | (—) $Z_o$ | \|Z/Zo\| |
| Example 1 | 30 | 1.5 | 1 | 1.5 | 1 | 2.5 | 0.4 | 0.029 | 0.039 | 0.74 |
| Example 2 | 30 | 1.5 | 1 | 1.5 | 1.5 | 2.5 | 0.6 | 0.019 | 0.039 | 0.49 |
| Example 3 | 30 | 1.5 | 1 | 1.5 | 2 | 2.5 | 0.8 | 0.022 | 0.039 | 0.56 |
| Example 4 | 30 | 0.1 | 1 | 0.1 | 0.1 | 2.5 | 0.04 | 0.027 | 0.039 | 0.69 |
| Example 5 | 30 | 0.2 | 1 | 0.2 | 0.5 | 2.5 | 0.2 | 0.028 | 0.039 | 0.72 |
| Example 6 | 30 | 1 | 1 | 1 | 1 | 2.5 | 0.4 | 0.032 | 0.039 | 0.82 |
| Example 7 | 30 | 1.5 | 1 | 1.5 | 1 | 3 | 0.33 | 0.025 | 0.042 | 0.6 |
| Example 8 | 30 | 1.5 | 1 | 1.5 | 1.5 | 3 | 0.5 | 0.025 | 0.042 | 0.6 |
| Example 9 | 40 | 1.5 | 1 | 1.5 | 1.5 | 3 | 0.5 | 0.031 | 0.043 | 0.72 |
| Example 10 | 60 | 1.5 | 1.8 | 0.83 | 1.5 | 3.5 | 0.43 | 0.046 | 0.057 | 0.81 |

As seen in Table 1, the polarizing plate including the polarizer manufactured by performing the first and second cross-linking and elongating steps by using the aqueous solution including both the boric acid compound and the polyvalent carboxylic acid compound has excellent dimensional stability as compared to the polarizing plate including the polarizer manufactured by performing the first and second cross-linking and elongating steps by using the first and second aqueous solutions including only the boric acid compound.

Specifically, all of the polarizing plates manufactured according to Examples 1 to 10 satisfy Equation (3). That is, in the case where in both the first and second cross-linking and elongating steps, in addition to the boron compound, the polyvalent carboxylic acid compound is included, the polarizer and the polarizing plate having excellent shrinkage improvement effect and durability may be manufactured.

Comparative Example 11

The polarizing plate was manufactured by the same procedure as Example 2, except that in the first cross-linking and elongating step, the aqueous solution not containing the glutaric acid (X=0) was used.

Comparative Example 12

The polarizing plate was manufactured by the same procedure as Example 1, except that in the second cross-linking and elongating step, the aqueous solution not containing the glutaric acid (Y=0) was used.

Comparative Example 13

The polarizing plate was manufactured by the same procedure as Example 9, except that in the first cross-linking and elongating step, the aqueous solution not containing the glutaric acid (X=0) was used.

Comparative Example 14

The polarizing plate was manufactured by the same procedure as Example 10, except that in the second cross-linking and elongating step, the aqueous solution not containing the glutaric acid (Y=0) was used.

Comparative Example 15

The polarizing plate was manufactured by the same procedure as Example 10, except that in the first aqueous solution, the content of the glutaric acid was 0.1 wt % and the content of the boric acid was 1.8 wt % (X=0.056) and in the second aqueous solution, the content of the glutaric acid was 0.1 wt % and the content of the boric acid was 3.5 wt % (Y=0.029).

<Experimental Example 3> Comparing and Evaluating Durability of Polarizing Plates Manufactured According to Comparative Examples 11 to 15 and Polarizing Plates Manufactured According to Examples The same experiment as Experimental Example 1 was performed, except that the polarizing plates manufactured according to Comparative Examples 11 to 15 were used.

In Comparative Examples 11 to 14, only one cross-linking and elongating step of the first and second cross-linking and elongating steps was performed by using the aqueous solution including the polyvalent carboxylic acid compound in addition to the boron compound.

Further, in Comparative Example 15, the first aqueous solution and the second aqueous solution used in the first and second cross-linking and elongating steps included the polyvalent carboxylic acid compound and the boron compound, but the cross-linking and elongating steps were performed by using the aqueous solution not satisfying Equations (1) and (2).

After evaluating durability of the polarizing plate which was manufactured under the same condition, except that both the first and second cross-linking and elongating steps were performed by using the aqueous solution including the polyvalent carboxylic acid compound in addition to the boron compound (that is, polarizing plate manufactured according to the Example) and the polarizing plates manufactured according to Comparative Examples 11 to 14, the MD direction relative dimensional variation ratios are arranged to be described in the following Table 2.

TABLE 2

| Classification | Thickness of polyvinyl alcohol film (μm) | First cross-linking and elongating step | | | Second cross-linking and elongating step | | | After durability evaluation, MD direction dimensional variation ratio | | Relative dimensional variation ratio $|Z/Z1o|$ |
|---|---|---|---|---|---|---|---|---|---|---|
| | | a1 (wt %) | b1 (wt %) | X (a1/b2) | a2 (wt %) | b2 (wt %) | Y (a2/b2) | (—) Z | (—) $Z1_o$ | |
| Comparative Example 11 | 30 | 0 | 1 | 0 | 1.5 | 2.5 | 0.6 | 0.019 (Example 2) | 0.037 | 0.51 |
| Comparative Example 12 | 30 | 1.5 | 1 | 1.5 | 0 | 2.5 | 0 | 0.029 (Example 1) | 0.033 | 0.88 |
| Comparative Example 13 | 40 | 0 | 1 | 0 | 1.5 | 3 | 0.5 | 0.031 (Example 9) | 0.039 | 0.79 |

TABLE 2-continued

| Classification | Thickness of polyvinyl alcohol film (μm) | First cross-linking and elongating step | | | Second cross-linking and elongating step | | | After durability evaluation, MD direction dimensional variation ratio | | Relative dimensional variation ratio $|Z/Z1_o|$ |
|---|---|---|---|---|---|---|---|---|---|---|
| | | a1 (wt %) | b1 (wt %) | X (a1/b2) | a2 (wt %) | b2 (wt %) | Y (a2/b2) | (—) Z | (—) $Z1_o$ | |
| Comparative Example 14 | 60 | 1.5 | 1.8 | 0.83 | 0 | 3.5 | 0 | 0.046 (Example 10) | 0.052 | 0.88 |

In Table 2, $Z1_o$ is the dimensional variation ratio of the polarizing plate including the polarizer manufactured by performing only one step of the first and second cross-linking and elongating steps by using the aqueous solution including the polyvalent carboxylic acid compound in addition to the boron compound, and Z is the same as that defined in Equation (3). That is, $Z1_o$ means the dimensional variation ratio of the polarizing plate manufactured according to Comparative Examples 11 to 14, and Z means the dimensional variation ratio of the polarizing plate manufactured according to the Example.

As seen in Table 1, in the case where both the first and second cross-linking and elongating steps are performed by using the aqueous solution including the polyvalent carboxylic acid compound in addition to the boron compound, as compared to the case where only one step of the first and second cross-linking steps is performed by using the aqueous solution including the polyvalent carboxylic acid compound in addition to the boron compound, the polarizer and the polarizing plate having excellent dimensional stability may be manufactured.

Experimental Example 4

The relative dimensional variation ratios of the polarizing plates including the polarizers in the case where both the first and second cross-linking and elongating steps were performed by using the aqueous solution not including the polyvalent carboxylic acid compound and in the case where only any one step of the first and second cross-linking and elongating steps was performed by using the aqueous solution including the polyvalent carboxylic acid compound in addition to the boron compound are arranged in the following Table 3.

TABLE 3

| Classification | Thickness of polyvinyl alcohol film (μm) | First cross-linking and elongating step | | | Second cross-linking and elongating step | | | After durability evaluation, MD direction dimensional variation ratio | | Relative dimensional variation ratio $|Z1_o/Z_o|$ |
|---|---|---|---|---|---|---|---|---|---|---|
| | | a1 (wt %) | b1 (wt %) | X (a1/b2) | a2 (wt %) | b2 (wt %) | Y (a2/b2) | (—) $Z1_o$ | (—) $Z_o$ | |
| Comparative Example 11 | 30 | 0 | 1 | 0 | 1.5 | 2.5 | 0.6 | 0.037 | 0.039 (Comparative Example 2) | 0.95 |
| Comparative Example 12 | 30 | 1.5 | 1 | 1.5 | 0 | 2.5 | 0 | 0.033 | 0.039 (Comparative Example 1, 2, or 3) | 0.88 |
| Comparative Example 13 | 40 | 0 | 1 | 0 | 1.5 | 3 | 0.5 | 0.039 | 0.043 (Comparative Example 9) | 0.91 |
| Comparative Example 14 | 60 | 1.5 | 1.8 | 0.83 | 0 | 3.5 | 0 | 0.052 | 0.057 (Comparative Example 10) | 0.91 |

Further, in Comparative Example 15, the relative dimensional variation ratio of the polarizing plate including the polarizer in the case where the first aqueous solution and the second aqueous solution used in the first and second cross-linking and elongating steps included the polyvalent carboxylic acid compound and the boron compound but the cross-linking and elongating step was performed by using the aqueous solution not satisfying Equations (1) and (2) is arranged in Table 4.

In the following Table 4, Z is defined by the dimensional variation ratio (Z) of the polarizing plate including the polarizer manufactured by using the aqueous solution including the boron compound and the polyvalent carboxylic acid compound in both the first and second cross-linking and elongating steps, and $Z_o$ means the dimensional variation ratio of the polarizing plate manufactured according to Comparative Example 10.

numerical value representing the content of the boric acid compound in the polarizer.

TABLE 5

|  | Content of remaining boron element (wt %) |
|---|---|
| Example 1 | 3.4 |
| Example 2 | 3.3 |
| Example 3 | 3.36 |
| Example 4 | 3.33 |
| Example 5 | 3.39 |
| Example 6 | 3.5 |
| Example 7 | 3.46 |
| Example 8 | 3.44 |
| Example 9 | 3.81 |
| Example 10 | 3.6 |

TABLE 4

| Classification | Thickness of polyvinyl alcohol film (μm) | First cross-linking and elongating step | | | Second cross-linking and elongating step | | | (—) Z | (—) $Z_o$ | After durability evaluation, MD direction dimensional variation ratio Relative dimensional variation ratio $\|Z/Zo\|$ |
|---|---|---|---|---|---|---|---|---|---|---|
|  |  | a1 (wt %) | b1 (wt %) | X (a1/b2) | a2 (wt %) | b2 (wt %) | Y (a2/b2) |  |  |  |
| Comparative Example 15 | 60 | 0.1 | 1.8 | 0.056 | 0.1 | 3.5 | 0.029 | 0.056 | 0.057 (Comparative Example 10) | 0.98 |

Reviewing Table 3, after evaluating durability, all relative dimensional variation ratios ($Z1_0/Z_0$) are more than 0.85 and thus do not satisfy Equation (3). This means that as compared to the case where only one step of the first and second cross-linking and elongating steps is performed by using the aqueous solution including the polyvalent carboxylic acid compound, in the case where both the first and second cross-linking and elongating steps are performed by using the aqueous solution including the polyvalent carboxylic acid compound in addition to the boron compound, the polarizer and the polarizing plate having a more excellent dimensional stability improvement effect may be manufactured.

Further, reviewing Table 4, after evaluating durability, the relative dimensional variation ratio ($Z/Z_0$) is more than 0.85 and thus does not satisfy Equation (3). Therefore, it can be confirmed that only when the first aqueous solution and the second aqueous solution used in the first and second cross-linking and elongating steps satisfy Equations (1) and (2), the polarizer and the polarizing plate having a more excellent dimensional stability improvement effect may be manufactured.

<Experimental Example 5> Measurement of Content of Boron Compound Remaining in Polarizer Before the final polarizing plate was manufactured by laminating the acryl film in the polarizers manufactured according to Examples 1 to 10, the contents of the boron elements remaining in the polarizers were measured, and are arranged in the following Table 5. As described above, the content of the boron element based on the polarizer is a

What is claimed is:

1. A polarizing plate comprising a polarizer and a protection film attached to at least one surface of the polarizer by using an adhesive layer,
   wherein the polarizer is manufactured by performing cross-linking and elongating steps including first cross-linking and elongating step and second cross-linking and elongating step with a first aqueous solution and a second aqueous solution respectively, each of which independently including a polyvalent carboxylic acid compound and a boron compound,
   wherein the cross-linking and elongating steps do not include a step using an aqueous solution containing only the boron compound as a cross-linking agent, and
   wherein a relative dimensional variation ratio ($Z/Z_0$) satisfies the following Equation (3) after evaluating durability under a condition where the polarizing plate is left at any one temperature selected from 60° C. to 70° C. for 48 hours and then left at any one temperature selected from 20° C. to 30° C. for 24 hours:

$$0<|Z/Z_0|<0.85 \qquad \text{Equation (3):}$$

in Equation (3),
Z is a dimensional variation ratio of the polarizing plate including the above said polarizer,
$Z_0$ is a dimensional variation ratio of the polarizing plate including the polarizer obtained by performing both the first and second cross-linking and elongating steps by using the aqueous solution including the boron compound but not including the polyvalent carboxylic acid compound, and
in Z and $Z_0$, contents of the boron compounds in the aqueous solutions are the same as each other.

2. A polarizing plate comprising a polarizer and a protection film attached to at least one surface of the polarizer by using an adhesive layer, wherein the polarizer is manufactured by performing cross-linking and elongating steps including first cross-linking and elongating step and second cross-linking and elongating step with a first aqueous solution and a second aqueous solution respectively, each of which independently including a polyvalent carboxylic acid compound and a boron compound, wherein the cross-linking and elongating steps do not include a step using an aqueous solution containing only the boron compound as a cross-linking agent, wherein the protection film is an acryl-based film, and the adhesive layer includes a cured material of an adhesive composition including an epoxy monomer or an acrylate-based monomer and a photopolymerization initiator and has a thickness of 2 μm to 4 μm, and wherein a relative dimensional variation ratio ($Z/Z_0$) satisfies the following Equation (3) after evaluating durability under a condition where the polarizing plate is left at any one temperature selected from 60° C. to 70° C. for 48 hours and then left at a temperature of any one selected from 20° C. to 30° C. for 24 hours:

$$0 < |Z/Z_0| < 0.85 \qquad \text{Equation (3):}$$

in Equation (3),

Z is a dimensional variation ratio of the polarizing plate including the above said polarizer, $Z_0$ is a dimensional variation ratio of the polarizing plate including the polarizer obtained by performing both the first and second cross-linking and elongating steps by using the aqueous solution including the boron compound but not including the polyvalent carboxylic acid compound, and in Z and $Z_0$, contents of the boron compounds in the aqueous solutions are the same as each other.

* * * * *

UNITED STATES PATENT AND TRADEMARK OFFICE
CERTIFICATE OF CORRECTION

PATENT NO. : 11,314,006 B2
APPLICATION NO. : 16/137293
DATED : April 26, 2022
INVENTOR(S) : Ji Young Kim et al.

It is certified that error appears in the above-identified patent and that said Letters Patent is hereby corrected as shown below:

On the Title Page

Item (72) Inventors should read: Ji Young Kim, Daejeon (KR); Hye Min Yu, Daejeon (KR); Kyun Il Rah, Daejeon (KR); Jin Yong Park, Daejeon (KR); Eungki Lee, Daejeon (KR); Taek Geun Nam, Daejeon (KR)

Signed and Sealed this
Second Day of August, 2022

Katherine Kelly Vidal
*Director of the United States Patent and Trademark Office*